United States Patent
Wenske

(10) Patent No.: US 8,098,766 B2
(45) Date of Patent: Jan. 17, 2012

(54) TRANSCEIVER WITH SWITCH CIRCUIT FOR ROUTING DATA FROM RECEIVER TO TRANSMITTER

(75) Inventor: Holger Wenske, Freising (DE)

(73) Assignee: Infineon Technologies AG, Neubiberg (DE)

( * ) Notice: Subject to any disclaimer, the term of this patent is extended or adjusted under 35 U.S.C. 154(b) by 971 days.

(21) Appl. No.: 11/961,604

(22) Filed: Dec. 20, 2007

(65) Prior Publication Data

US 2009/0161740 A1   Jun. 25, 2009

(51) Int. Cl.
*H03K 9/00* (2006.01)

(52) U.S. Cl. .......... 375/316; 375/224; 370/395.62; 398/155; 702/120; 714/716

(58) Field of Classification Search ............ None
See application file for complete search history.

(56) References Cited

U.S. PATENT DOCUMENTS

| | | | |
|---|---|---|---|
| 6,463,109 B1* | 10/2002 | McCormack et al. | 375/355 |
| 7,106,812 B2 | 9/2006 | Engl et al. | |
| 7,218,670 B1* | 5/2007 | Lesea et al. | 375/226 |
| 2001/0035994 A1 | 11/2001 | Agazzi et al. | |
| 2001/0043648 A1* | 11/2001 | Ducaroir et al. | 375/224 |

OTHER PUBLICATIONS

Wikipedia.com webpage entitled "Multi-Gigabit Tranceiver," modified Jul. 2007; 5 pgs.

\* cited by examiner

*Primary Examiner* — David C. Payne
*Assistant Examiner* — Adolf Dsouza
(74) *Attorney, Agent, or Firm* — Dicke, Billig & Czaja, PLLC

(57) ABSTRACT

A transceiver includes a receiver unit including a clock and data recovery unit. The transceiver includes a transmitter unit and a digital core coupled to the receiver unit and the transmitter unit. A switch circuit is positioned after the clock and data recovery unit, and is configured to route data from the receiver unit to the transmitter unit in a test mode of the transceiver.

17 Claims, 3 Drawing Sheets

# TRANSCEIVER WITH SWITCH CIRCUIT FOR ROUTING DATA FROM RECEIVER TO TRANSMITTER

BACKGROUND

High-speed serial transceivers are typically tested using costly equipment that delivers test signals to the transceiver and acquires signals coming out of the transceiver. Testing of receiver portions of a transceiver can be difficult because the high-speed serial data coming out of the receiver is generally only available inside of the transceiver chip.

SUMMARY

One embodiment provides a transceiver including a receiver unit. The receiver unit includes a clock and data recovery unit. The transceiver includes a transmitter unit and a digital core coupled to the receiver unit and the transmitter unit. A switch circuit is positioned after the clock and data recovery unit, and is configured to route data from the receiver unit to the transmitter unit in a test mode of the transceiver.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
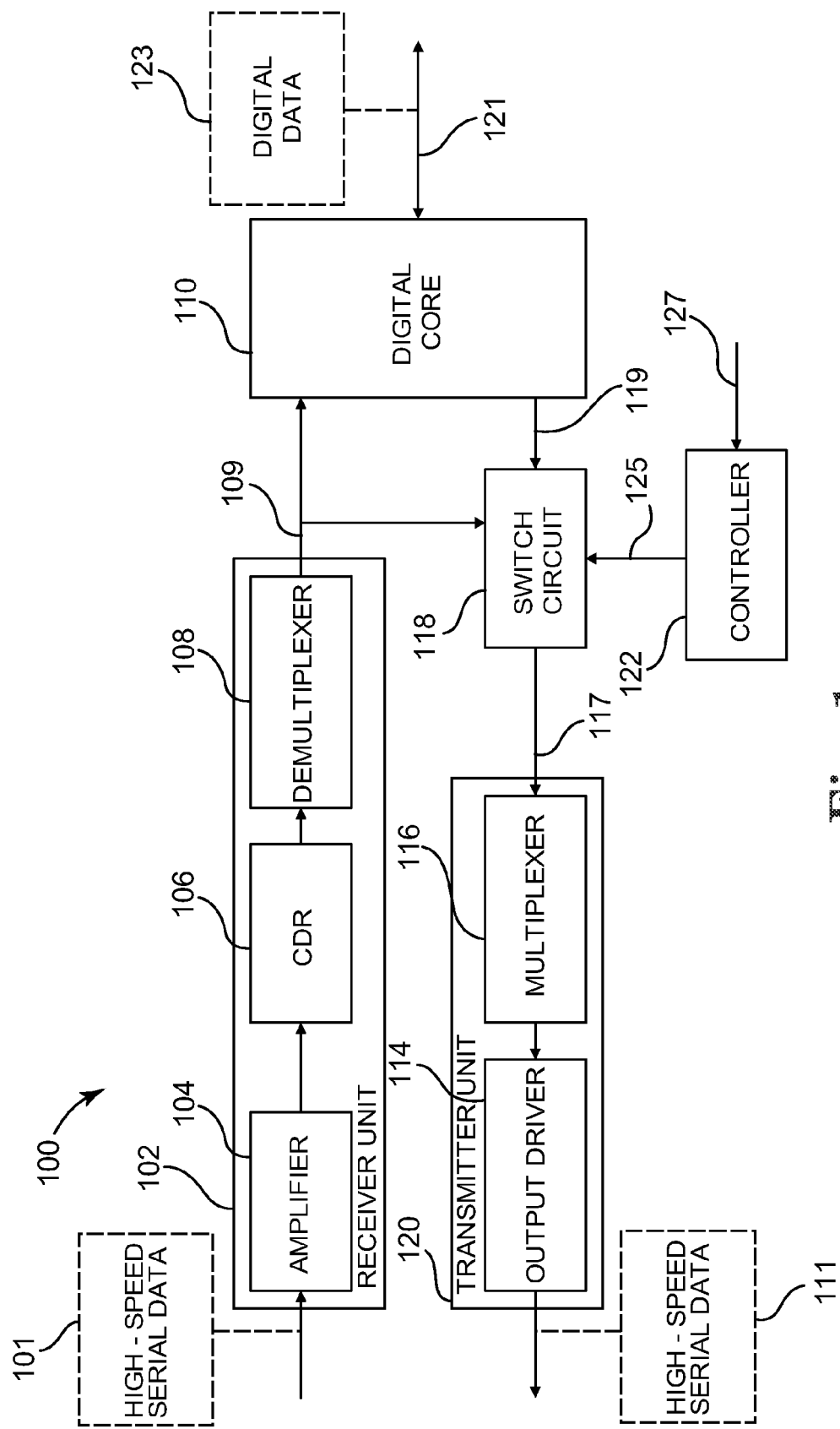
FIG. 1 is a block diagram illustrating a transceiver according to one embodiment.

FIG. 1 is a block diagram illustrating a transceiver 100 according to one embodiment. In one embodiment, transceiver 100 is implemented in an integrated circuit and is configured to transmit and receive high-speed serial data at a rate of 1 Gigabits/second or higher. In one embodiment, transceiver 100 is configured in accordance with the Serial ATA Revision 2.5 standard from the Serial ATA International Organization. In another embodiment, transceiver 100 is configured in accordance with the PCI Express® Base Specification Revision 1.1 or 2.0 from the Peripheral Component Interconnect Special Interest Group (PCI-SIG).

Transceiver 100 includes receiver unit 102, transmitter unit 120, switch circuit 118, digital core 110, and controller 122. Receiver unit 102 includes amplifier 104, clock and data recovery (CDR) unit 106, and demultiplexer 108. Transmitter unit 120 includes output driver 114 and multiplexer 116. Amplifier 104 in receiver unit 102 is configured to receive high-speed serial data signals 101, amplify the received signals, and output the amplified signals to CDR unit 106. CDR unit 106 recovers a clock signal from the received amplified signals, uses the recovered clock signal to recover serial data in the received amplified signals, and outputs the serial data to demultiplexer 108. Demultiplexer 108 demultiplexes (i.e., de-serializes or parallelizes) the received serial data, and outputs de-serialized digital data on communication link 109. In one embodiment, demultiplexer 108 converts the received serial data to 8-bit bytes, and communication link 109 includes eight data lines for carrying each 8-bit byte. Thus, according to one embodiment, a portion of the overall de-serialization process is performed by demultiplexer 108 in receiver unit 102, which lowers the data rate before feeding the data into the digital core 110. In one embodiment, digital core 110 performs additional de-serialization of the received data.

Communication link 109 is coupled to digital core 110 and to switch circuit 118. In a normal mode of operation, switch circuit 118 is disabled, and the digital data output by demultiplexer 108 via communication link 109 is received and processed by digital core 110. Digital core 110 outputs processed digital data 123 via communication link 121. In one embodiment, digital core 110 is configured to perform a variety of functions on digital data received from receiver unit 102, including, for example, de-serialization, decoding (e.g., 10-bit to 8-bit decoding), de-framing, and error detection (e.g., verification of CRCs or checksums).

Transceiver 100 is also configured to transmit data. Digital data 123 to be transmitted is provided to digital core 110 via communication link 121. In one embodiment, digital core 110 is configured to perform a variety of functions on digital data 123 to be transmitted, including, for example, framing, adding error detection information, encoding (e.g., 8-bit to 10-bit encoding), and serialization. Digital core 110 outputs digital data to switch circuit 118 via communication link 119. In a normal mode of operation, switch circuit 118 is disabled, and the digital data output by digital core 110 via communication link 119 passes through switch circuit 118, and is provided to multiplexer 116 on communication link 117. Multiplexer 116 multiplexes or serializes the received digital data, and outputs multiplexed or serialized data signals to output driver 114. In one embodiment, multiplexer 116 converts received 8-bit bytes to serial data signals, which are provided to output driver 114. In one embodiment, communication links 117 and 119 each include eight data lines for carrying each 8-bit byte. Output driver 114 amplifies the serial data signals and transmits the serial data signals as high-speed serial data 111.

In one embodiment, transceiver 100 includes a programmable test mode of operation. A user causes transceiver 100 to exit the normal mode and enter the test mode in one embodiment by sending an ENABLE TEST MODE signal to controller 122 via communication link 127. In response to a received ENABLE TEST MODE signal, controller 122 sends a LOOP ENABLE signal to switch circuit 118 via communication link 125. In the test mode according to one embodiment, switch circuit 118 is enabled, and the digital data output by demultiplexer 108 via communication link 109 is received by switch circuit 118, and then output from switch circuit 118 to multiplexer 116 via communication link 117. Transmitter 120 then transmits the data in the manner described above. Thus, in the test mode according to one embodiment, data received by receiver unit 102 is routed via switch circuit 118 to transmitter unit 120 for transmission, thereby allowing external testing of the receiver unit 102, including the CDR unit 106, based on the transmitted data.

Figure 2:
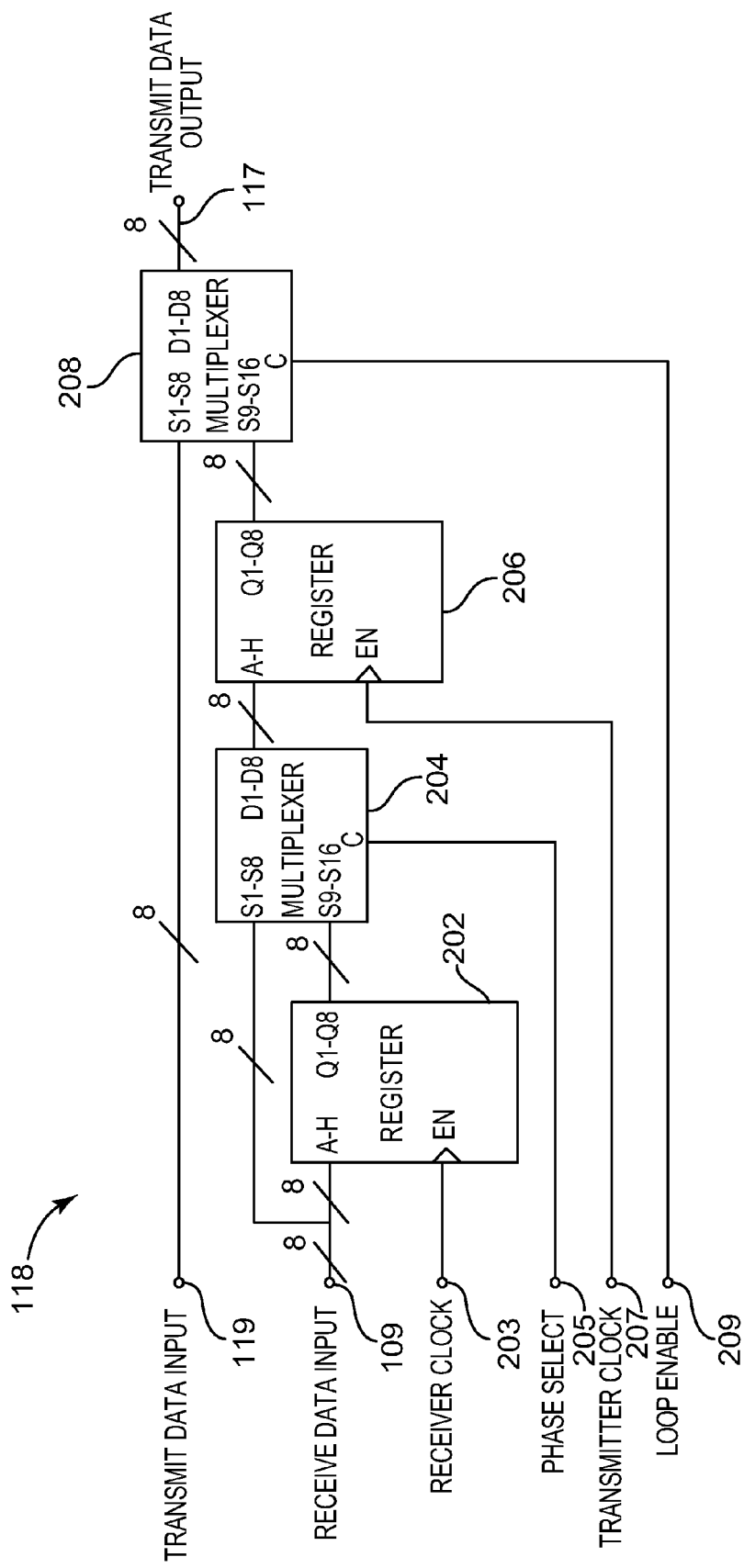
FIG. 2 is a schematic diagram illustrating a transceiver switch circuit according to one embodiment.

FIG. 2 is a schematic diagram illustrating a switch circuit 118 according to one embodiment. Switch circuit 118 includes registers 202 and 206, and multiplexers 204 and 208. In the illustrated embodiment, registers 202 and 206 are each 8-bit registers with eight inputs A-H, eight outputs Q1-Q8, and an enable pin EN. Multiplexers 204 and 208 each include a first set of eight inputs S1-S8, a second set of eight inputs S9-S16, eight outputs D1-D8, and a control pin C.

As mentioned above, demultiplexer 108 (FIG. 1) outputs digital data to switch circuit 118 via communication link 109. As shown in FIG. 2, communication link 109 is coupled to the eight inputs A-H of register 202, and to the first set of eight inputs S1-S8 of multiplexer 204. The eight outputs Q1-Q8 of register 202 are coupled to respective ones of the second set of eight inputs S9-S16 of multiplexer 204. Register 202 is clocked via enable pin EN, which receives a receiver clock signal (e.g., a clock signal that is also used to control receiver unit 102) via communication link 203. Register 202 outputs received digital data to multiplexer 204 via outputs Q1-Q8 based on the receiver clock signal. Multiplexer 204 is controlled via control pin C, which receives a PHASE SELECT signal via communication link 205. The PHASE SELECT signal indicates which of the two sets of inputs S1-S8 or S9-S16 of the multiplexer 204 will be output from the multiplexer 204 via outputs D1-D8. Thus, depending upon the PHASE SELECT signal, multiplexer 204 will either output data received directly from communication link 109 through inputs S1-S8, or output data received by register 202 from communication link 109, and then output from register 202 to the S9-S16 inputs of multiplexer 204.

The outputs D1-D8 of multiplexer 204 are coupled to respective ones of the inputs A-H of register 206. Register 206 is clocked via enable pin EN, which receives a transmitter clock signal (e.g., a clock signal that is also used to control transmitter unit 120) via communication link 207. Register 206 outputs received data to multiplexer 208 via outputs Q1-Q8 based on the transmitter clock signal. Multiplexer 208 is controlled via control pin C, which receives a LOOP ENABLE signal via communication link 209. The LOOP ENABLE signal indicates which of the two sets of inputs S1-S8 or S9-S16 of the multiplexer 208 will be output from the multiplexer 208 via outputs D1-D8. Thus, depending upon the LOOP ENABLE signal, multiplexer 208 will either output data received directly from communication link 119 through inputs S1-S8, or will output data received through inputs S9-S16 from register 206. In one embodiment, controller 122 is configured to generate the PHASE SELECT and LOOP ENABLE signals, and communication link 125 (FIG. 1) includes the communication links 205 and 209.

The LOOP ENABLE signal on communication link 209 indicates whether the switch circuit 118 is enabled or disabled. When the switch circuit 118 is disabled, multiplexer 208 uses inputs S1-S8 as the source of data to be output from the switch circuit 118 via communication link 117. Thus, when the switch circuit 118 is disabled, switch circuit 118 receives digital data from digital core 110 on communication link 119, and outputs the received digital data to multiplexer 116 via communication link 117. When the switch circuit 118 is enabled, multiplexer 208 uses inputs S9-S16 as the source of data to be output from the switch circuit 118 via communication link 117. Thus, when the switch circuit 118 is enabled, switch circuit 118 receives digital data from receiver unit 102 on communication link 109, and outputs the received digital data to multiplexer 116 via communication link 117.

In the embodiment shown in FIG. 2, switch circuit 118 receives 8-bit digital data from receiver unit 102 (communication link 109 includes eight data lines). In other embodiments, more or less than eight data lines are used. In one embodiment, the number of data lines connected to switch circuit 118 and thus the data rate is chosen according to the distance that is bridged between the receiver unit 102 and the transmitter unit 120. In one embodiment, at higher data rates, less data lines are used, and at lower data rates, more data lines are used. At typical current data rates, eight data lines and thus a data rate of ⅛th of the serial data rate provides a good compromise between number of lines and data frequency.

In one embodiment, switch circuit 118 performs handshaking functions to bridge the two different clock domains (i.e., the transmitter clock and the receiver clock) of the transceiver 100. In one embodiment, the transmitter clock runs at the same rate as the receiver clock, and switch circuit 118 eliminates phase differences between the two clock domains. In one embodiment, register 202 samples receiver data from demultiplexer 108 with an inverted receiver clock (via communication link 203), and register 206 is filled with receiver data on demand of the transmitter clock (via communication link 207). This embodiment provides proper setup and hold times regardless of phase shifts between receiver and transmitter clocks. In another embodiment, the receiver data is sampled directly from the receiver output registers.

Figure 3:
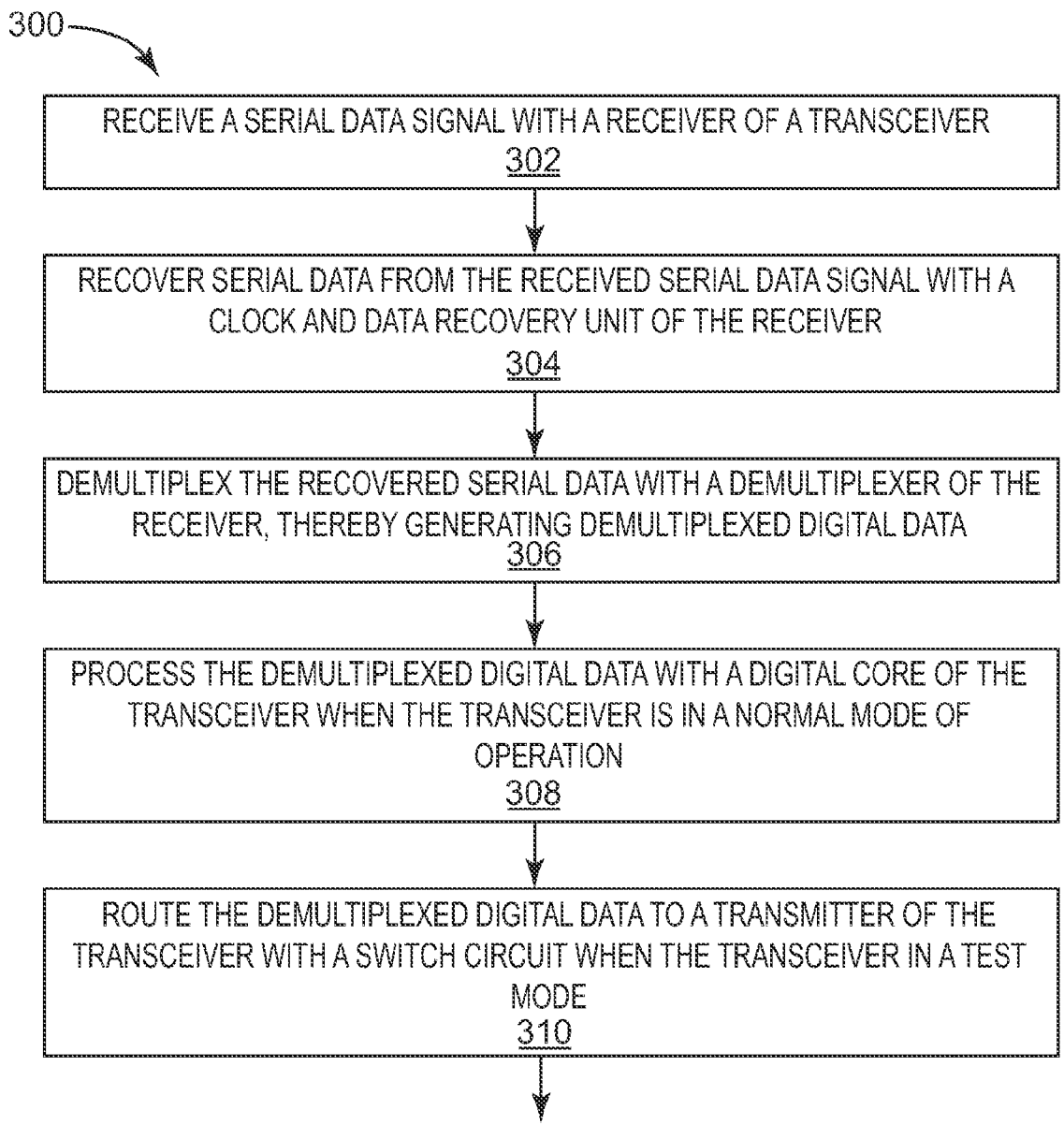
FIG. 3 is a flow diagram illustrating a method for testing a transceiver according to one embodiment.

FIG. 3 is a flow diagram illustrating a method 300 for testing a transceiver according to one embodiment. Method 300 will be described with reference to transceiver 100 (FIG. 1). At 302, transceiver 100 receives a serial data signal (e.g., high-speed serial data 101) with a receiver 102 of the transceiver 100. At 304, a clock and data recovery unit 106 of the receiver 102 recovers serial data from the received serial data signal. At 306, the recovered serial data is demultiplexed with a demultiplexer 108 of the receiver 102, thereby generating demultiplexed digital data. At 308, the demultiplexed digital data is processed with a digital core 110 of the transceiver 100 when the transceiver 100 is in a normal mode of operation. At 310, the demultiplexed digital data is routed to a transmitter 120 of the transceiver 100 with a switch circuit 118 when the transceiver 100 is in a test mode.

One embodiment provides a transceiver integrated circuit (IC) 100 that includes a switch circuit 118 for looping data received from a receiver unit 102 of the IC to a transmitter unit 120 of the IC, thereby allowing the received data to be transmitted from and monitored outside of the IC. In one embodiment, the loop is closed with a switch circuit 118 positioned after the CDR unit 106 and before the digital core 110. Switch circuit 118 according to one embodiment taps the data at a point in the de-serialization chain where there is an optimum data rate and number of data lines for routing the data from the output of the high-speed receiver unit 102 to the input of the transmitter unit 120.

The loop between a receiver and a transmitter in a transceiver could be closed prior to the CDR unit, but such a configuration would not provide any information about the functioning of the CDR unit. The loop between a receiver and a transmitter could also be closed inside of the digital core of the transceiver after the de-multiplexing and de-framing of the data. Because there are low data and clock frequencies at this location, transfers between different clock domains are relatively simple to implement. However, a disadvantage of closing the loop inside of the digital core in this manner is that the data that is delivered to the transmitter is not bit-true to the received data because of the reframing. Thus, a relatively expensive frame analyzer is needed to measure possible bit errors caused by receiver failures. In addition, with such an implementation, the high-speed serial transceiver module can not be tested independent from the digital core, which complicates debugging. In contrast, closing the loop after the CDR unit 106 and before the digital core 110 with switch circuit 118, as is done in one embodiment, provides bit-true data to the transmitter unit 120, expensive frame analyzer equipment is not needed, and information regarding the functioning of the CDR unit 106 can be obtained.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A transceiver comprising:
   a receiver unit including a clock and data recovery unit;
   a transmitter unit;
   a digital core coupled to the receiver unit and the transmitter unit;
   a switch circuit positioned after the clock and data recovery unit, and configured to route data from the receiver unit to the transmitter unit in a test mode of the transceiver;
   wherein the receiver unit includes a demultiplexer coupled to an output of the clock and data recovery unit, and wherein the switch circuit includes a first register having inputs coupled to outputs of the demultiplexer; and
   wherein the switch circuit includes a first multiplexer having a first set of inputs coupled to outputs of the first register, and having a second set of inputs coupled to the outputs of the demultiplexer.

2. The transceiver of claim 1, wherein the demultiplexer is configured to convert serial data received from the clock and data recovery unit to 8-bit bytes, and output the 8-bit bytes to the digital core and the switch circuit.

3. The transceiver of claim 1, wherein the digital core is configured to perform de-serialization, decoding, de-framing, and error detection, on data received from the receiver unit.

4. The transceiver of claim 1, wherein the first register is configured to be clocked with a receiver clock signal.

5. The transceiver of claim 1, wherein the switch circuit includes a second register having inputs connected to outputs of the first multiplexer.

6. The transceiver of claim 5, wherein the second register is configured to be clocked with a transmitter clock signal.

7. The transceiver of claim 5, wherein the switch circuit includes a second multiplexer having a first set of inputs connected to outputs of the digital core, and a second set of inputs connected to outputs of the second register.

8. The transceiver of claim 7, wherein the second multiplexer includes outputs connected to the transmitter unit.

9. The transceiver of claim 8, wherein the second multiplexer is configured to selectively switch the first set of inputs or the second set of inputs of the second multiplexer to the outputs of the second multiplexer based on whether the transceiver is in a normal mode of operation or a test mode of operation.

10. The transceiver of claim 1, wherein the transceiver is configured to transmit and receive serial data at a rate of at least 1 Gigabits/second.

11. A method of testing a transceiver, comprising:
    receiving a serial data signal with a receiver of the transceiver;
    recovering serial data from the received serial data signal with a clock and data recovery unit of the receiver;
    demultiplexing the recovered serial data, thereby generating demultiplexed digital data;
    processing the demultiplexed digital data with a digital core of the transceiver when the transceiver is in a normal mode of operation; and
    separately receiving the demultiplexed digital data with both a register and a multiplexer of a switch circuit in the transceiver and routing the demultiplexed digital data to a transmitter of the transceiver via the switch circuit when the transceiver is in a test mode.

12. The method of claim 11, wherein the demultiplexed digital data comprises 8-bit bytes.

13. The method of claim 11, wherein processing the demultiplexed digital data comprises performing de-serialization, decoding, de-framing, and error detection.

14. The method of claim 11, wherein the routing of the demultiplexed digital data is performed by a switch circuit, and wherein the method further comprises:
    receiving a receiver clock signal with the switch circuit; and
    receiving a transmitter clock signal with the switch circuit.

15. The method of claim 11, wherein the multiplexer of the switch circuit includes a set of inputs coupled to outputs of the register.

16. A transceiver integrated circuit comprising:
    a receiver unit including a clock and data recovery unit and a demultiplexer coupled to an output of the clock and data recovery unit;
    a transmitter unit;
    a digital core coupled to outputs of the demultiplexer, and coupled to the transmitter unit via a switch circuit; and
    wherein the switch circuit is coupled to the outputs of the demultiplexer and is configured to route digital data from the demultiplexer to the transmitter unit in a test mode of the transceiver, wherein the switch circuit includes a register having inputs coupled to the outputs of the demultiplexer, and wherein the switch circuit includes a multiplexer having a first set of inputs coupled to outputs of the register and having a second set of inputs coupled to the outputs of the demultiplexer.

17. The transceiver integrated circuit of claim 16, wherein the switch circuit is configured to be clocked with a transmitter clock signal and a receiver clock signal.

* * * * *